(12) United States Patent
Prior

(10) Patent No.: US 11,723,760 B2
(45) Date of Patent: Aug. 15, 2023

(54) AEROSOL DEFLECTING DENTAL SHIELD AND CONTAINMENT DEVICE

(71) Applicant: Gregory Prior, Clearwater, FL (US)

(72) Inventor: Gregory Prior, Clearwater, FL (US)

( * ) Notice: Subject to any disclaimer, the term of this patent is extended or adjusted under 35 U.S.C. 154(b) by 0 days.

(21) Appl. No.: 17/883,142

(22) Filed: Aug. 8, 2022

(65) Prior Publication Data

US 2023/0037832 A1 Feb. 9, 2023

Related U.S. Application Data

(60) Provisional application No. 63/230,219, filed on Aug. 6, 2021.

(51) Int. Cl.
*A61C 17/08* (2006.01)

(52) U.S. Cl.
CPC .................... *A61C 17/08* (2019.05)

(58) Field of Classification Search
CPC ....... A61C 17/08; A61C 17/06; A61C 17/092; A61C 17/096; A61C 17/10; A61C 17/0208
See application file for complete search history.

(56) References Cited

U.S. PATENT DOCUMENTS

| | | | | |
|---|---|---|---|---|
| 1,471,207 A * | 10/1923 | Riddle | ................... | A61C 17/08 138/109 |
| 1,986,751 A * | 1/1935 | Robinson | ............... | A61C 17/08 433/91 |
| 2,005,625 A * | 6/1935 | La Riche | ............... | A61C 17/08 433/91 |
| 2,195,771 A * | 4/1940 | Estler | ..................... | A61M 27/00 604/313 |
| 2,482,116 A * | 9/1949 | Lanahan | ................ | A61B 13/00 600/240 |
| 2,731,722 A * | 1/1956 | Wilen | ...................... | A61C 1/16 433/116 |
| 2,937,445 A * | 5/1960 | Erickson | .................. | A61B 1/24 433/93 |
| 3,090,122 A * | 5/1963 | Erickson | ................ | A61C 17/08 600/238 |
| 3,101,544 A * | 8/1963 | Baughan | ................ | A61C 17/08 433/94 |

(Continued)

*Primary Examiner* — Nicholas D Lucchesi
*Assistant Examiner* — Hao D Mai
(74) *Attorney, Agent, or Firm* — Mark C. Johnson; Johnson Dalal

(57) ABSTRACT

An aerosol deflecting dental shield and containment device having a cylindrical base with a lower free end and with a base sidewall having an inner surface enclosing and defining a base channel base channel defining a base channel diameter and with an HVE adapted to be inserted therein. The device also includes a circular base platform radially extending outwardly from the base channel, a deflecting member coupled to the circular base platform, with an outer surface opposing the lower free end, of an elastic polymeric material, defining an intake aperture fluidly coupled to the base channel, and defining a deflection diameter of a length at least twice a length of the base channel diameter, and a cantilevered tooth rest member projecting from the outer surface of the deflecting member, having a spherical apex disposed at a distal end thereon, and of an elastic polymeric material.

20 Claims, 12 Drawing Sheets

(56) References Cited

U.S. PATENT DOCUMENTS

| | | | |
|---|---|---|---|
| 3,139,088 A * | 6/1964 | Galleher, Jr. | A61M 16/0493 128/857 |
| 3,402,984 A | 9/1968 | Zazzara | |
| 3,758,950 A * | 9/1973 | Krouzian | A61C 17/08 433/91 |
| 3,768,477 A * | 10/1973 | Anders | A61C 17/08 433/91 |
| 3,777,756 A * | 12/1973 | Lohr | A61C 17/08 433/91 |
| 3,802,081 A * | 4/1974 | Rogers | A61C 17/08 433/93 |
| 3,864,831 A * | 2/1975 | Drake | A61C 17/08 433/91 |
| 3,877,691 A * | 4/1975 | Foster | A61M 16/009 128/200.24 |
| 3,881,254 A * | 5/1975 | Epstein | A61C 17/08 433/96 |
| 3,924,333 A * | 12/1975 | Erickson | A61C 17/08 433/93 |
| 4,017,975 A * | 4/1977 | Johnson | A61C 17/08 433/91 |
| 4,024,642 A * | 5/1977 | Zorovich | A61C 17/10 433/140 |
| 4,083,115 A * | 4/1978 | McKelvey | A61C 17/08 433/96 |
| 4,167,814 A * | 9/1979 | Schubert | A61C 17/08 433/93 |
| 4,215,984 A * | 8/1980 | Reichley | A61C 17/08 433/93 |
| D258,531 S * | 3/1981 | Orsing | D24/112 |
| 4,259,067 A * | 3/1981 | Nelson | A61C 17/08 433/93 |
| 4,424,036 A * | 1/1984 | Lokken | A61C 17/005 433/116 |
| 4,643,674 A | 2/1987 | Zdarsky | |
| 4,689,020 A | 8/1987 | Rusk | |
| 4,776,793 A * | 10/1988 | La Rocca | A61C 17/08 433/96 |
| 4,802,851 A * | 2/1989 | Rhoades | A61C 17/08 433/140 |
| 4,807,625 A * | 2/1989 | Singleton | A61B 17/4208 604/45 |
| 4,865,545 A * | 9/1989 | La Rocca | A61C 17/08 433/96 |
| 4,898,588 A * | 2/1990 | Roberts | A61M 3/0287 604/242 |
| 4,906,188 A * | 3/1990 | Moseley | A61C 17/08 433/93 |
| D307,474 S * | 4/1990 | Cook | D24/130 |
| 4,975,057 A * | 12/1990 | Dyfvermark | A61B 1/24 433/91 |
| 5,078,602 A * | 1/1992 | Honoshofsky | A61C 17/08 433/91 |
| 5,080,587 A * | 1/1992 | Miyao | A61C 17/08 433/91 |
| 5,094,616 A * | 3/1992 | Levenson | A61C 17/08 433/91 |
| 5,127,411 A * | 7/1992 | Schoolman | A61C 17/06 433/91 |
| 5,133,701 A * | 7/1992 | Han | B65D 83/64 604/289 |
| 5,152,686 A * | 10/1992 | Duggan | A61C 17/08 433/140 |
| 5,165,891 A * | 11/1992 | Young | A61C 17/08 251/297 |
| 5,224,940 A * | 7/1993 | Dann | A61B 90/05 604/311 |
| 5,232,362 A * | 8/1993 | Kanas | A61C 17/08 433/91 |
| 5,263,860 A * | 11/1993 | Shen | A61C 17/06 433/91 |
| D344,133 S * | 2/1994 | Stamler | D24/130 |
| D345,016 S * | 3/1994 | Stamler | D24/130 |
| 5,364,375 A * | 11/1994 | Swor | A61M 31/00 604/515 |
| 5,368,482 A | 11/1994 | Johnsen et al. | |
| D360,685 S * | 7/1995 | Olsson | D24/176 |
| 5,441,410 A * | 8/1995 | Segerdal | A61C 17/08 D24/176 |
| 5,509,802 A * | 4/1996 | Whitehouse | A61C 17/08 433/95 |
| 5,588,836 A * | 12/1996 | Landis | A61C 17/08 433/93 |
| 5,590,643 A * | 1/1997 | Flam | A61M 16/0488 128/207.14 |
| 5,626,128 A * | 5/1997 | Bradley | A61M 16/0488 128/207.14 |
| 5,690,487 A * | 11/1997 | Whitehouse | A61C 17/08 433/91 |
| 5,735,833 A * | 4/1998 | Olson | A61M 35/00 604/289 |
| 5,791,705 A | 8/1998 | Romero et al. | |
| 5,941,859 A * | 8/1999 | Lerman | A61M 3/0287 604/289 |
| 6,135,770 A * | 10/2000 | Bembenek | A61C 5/82 433/136 |
| 6,186,783 B1 * | 2/2001 | Brassil | A61C 17/08 433/91 |
| 6,210,381 B1 * | 4/2001 | Morse | A61B 90/80 604/289 |
| 6,293,929 B1 * | 9/2001 | Smith | A61M 3/0287 604/289 |
| 6,299,444 B1 * | 10/2001 | Cohen | A61C 17/08 433/91 |
| 6,328,494 B1 | 12/2001 | Moxon | |
| 6,705,788 B2 | 3/2004 | Gadberry | |
| 6,821,118 B2 * | 11/2004 | Schlussel | A61C 17/08 433/91 |
| 7,021,930 B2 * | 4/2006 | Schemmer | A61C 19/063 433/80 |
| 7,137,393 B2 * | 11/2006 | Pivovarov | A61F 5/566 128/859 |
| 7,214,059 B2 * | 5/2007 | Takahashi | A61C 17/08 433/91 |
| 7,238,023 B1 * | 7/2007 | Enos | A61C 17/08 433/91 |
| 7,900,632 B2 * | 3/2011 | Cook | A61M 16/0409 128/207.14 |
| 7,934,502 B2 * | 5/2011 | Cook | A61M 16/0434 128/207.14 |
| D659,824 S * | 5/2012 | Kwok | D24/176 |
| 8,784,392 B2 * | 7/2014 | Vess | A61M 1/98 604/304 |
| 8,870,568 B1 * | 10/2014 | Ream | A61C 17/08 433/93 |
| 9,486,563 B2 * | 11/2016 | Taddeo | A61C 17/096 |
| 9,888,989 B2 * | 2/2018 | Ishizaki | A61C 17/12 |
| 10,264,949 B2 | 4/2019 | Geldrich | |
| 10,407,223 B1 * | 9/2019 | Woods | A61B 46/10 |
| D871,571 S * | 12/2019 | Chen | A61F 5/566 D24/110.5 |
| 10,583,228 B2 * | 3/2020 | Shuler | A61F 13/0216 |
| 10,813,636 B2 * | 10/2020 | Viola | A61B 17/00491 |
| D942,617 S * | 2/2022 | Smith | D24/112 |
| 11,389,673 B2 * | 7/2022 | Eisenkraft | A61M 16/0493 |
| 11,419,632 B2 * | 8/2022 | Kunis | A61B 17/3478 |
| 11,432,917 B2 * | 9/2022 | Koo | A61C 17/08 |
| 2007/0057129 A1 * | 3/2007 | White | A61C 19/00 248/213.2 |
| 2008/0053434 A1 * | 3/2008 | Wightman | A61M 16/0488 128/207.14 |
| 2008/0318183 A1 * | 12/2008 | Suzman | A61C 17/08 433/93 |
| 2010/0190133 A1 * | 7/2010 | Martinez | A61C 17/0208 604/319 |
| 2015/0209562 A1 * | 7/2015 | Harari | A61F 2/30723 604/113 |
| 2020/0000541 A1 * | 1/2020 | Clemens | A61C 17/0208 |
| 2021/0338396 A1 * | 11/2021 | Crohin | A61G 15/16 |

(56) References Cited

U.S. PATENT DOCUMENTS

| | | | |
|---|---|---|---|
| 2021/0346134 A1* | 11/2021 | Reingold | A61C 17/08 |
| 2021/0353395 A1* | 11/2021 | Kim | A61M 1/87 |
| 2021/0369429 A1* | 12/2021 | Johnson | A61C 17/08 |
| 2021/0379413 A1* | 12/2021 | Bagga | A62B 7/12 |
| 2022/0142269 A1* | 5/2022 | Orrington, II | A61B 90/05 |
| 2022/0257357 A1* | 8/2022 | Root | A61C 17/10 |
| 2022/0258075 A1* | 8/2022 | Tang | B01D 29/05 |

\* cited by examiner

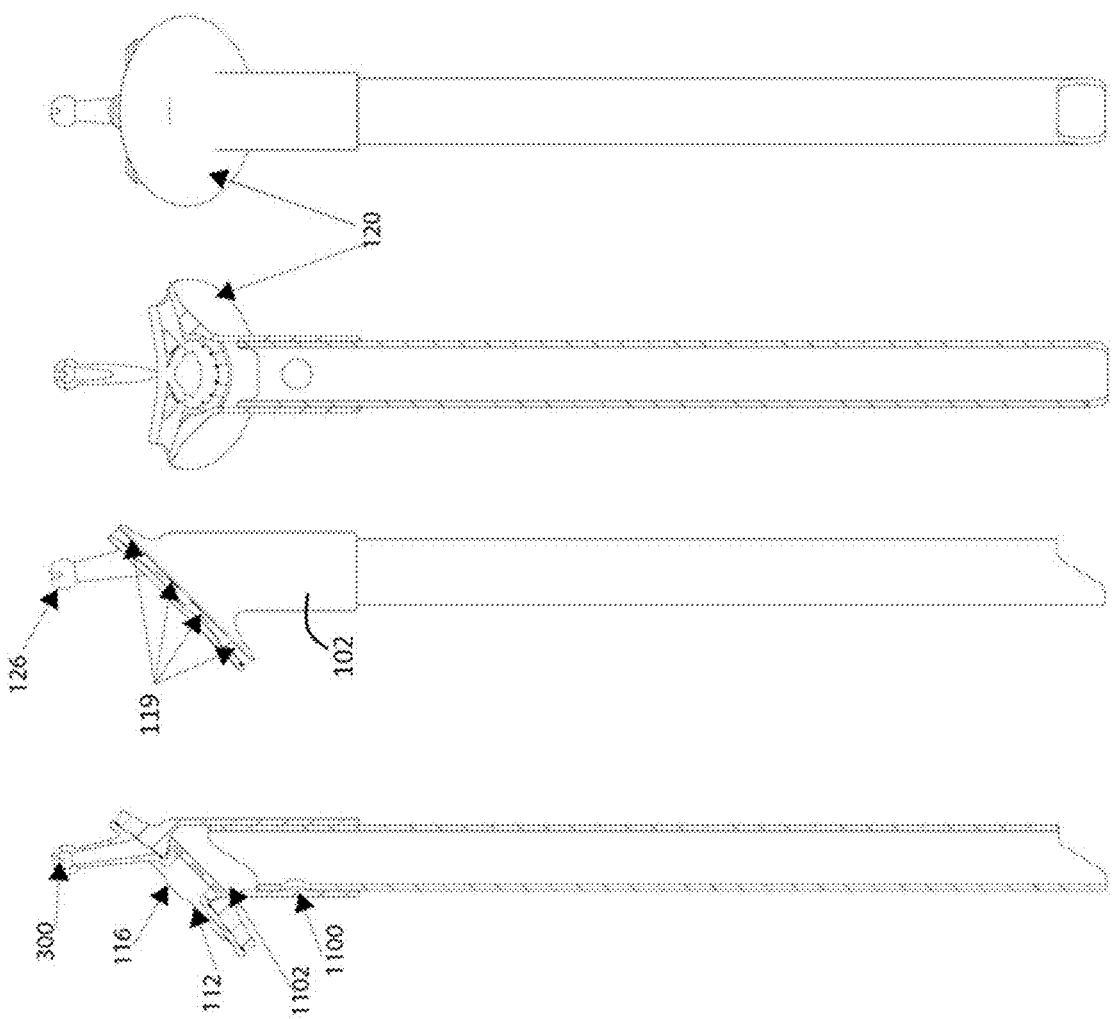

AEROSOL DEFLECTING DENTAL SHIELD AND CONTAINMENT DEVICE

FIELD OF THE INVENTION

The present invention relates generally to dental attachments and accessories and, more particularly, relates to an aerosol deflecting dental shield and containment device.

BACKGROUND OF THE INVENTION

Select dental instruments such as, by way of example and without limitation, ultra-sonic scaling instruments designed to remove stains, hardened calculus deposits, and plaque produce and emit an aerosol mist when used which often escapes the patient's oral cavity and permeates the air within the dental room or office. Particularly in the wake of the COVID-19 pandemic, the health and safety concerns posed by escaping aerosols are alarmingly high for dental hygienists, dental assistants, and dentists. More specifically, escaping aerosols from a patient's oral cavity may carry pathogens or particulates that can infect dental staff and proliferate the spread of bacteria and viruses. Because ultra-sonic scaling instruments vibrate at thousands of cycles per second, they generate heat, so a stream of water is necessary to cool the instrument. The vibration causes the cooling stream of water to form an aerosol mist. Existing prior art, namely, high- and low-volume evacuation equipment, are characterized by severe limitations which fail to provide dental staff (primarily, dental hygienists) with a feasible and practicable solution to the problem. To effectively suction saliva and excess water from a patient's oral cavity, the openings at the tip of low-volume evacuation equipment must be submerged in the liquid, i.e., the saliva or excess water. As such, low-volume evacuation equipment (also commonly referred to as saliva ejectors) effectively removes pooled liquids but does not effectively capture and suction aerosols escaping from an oral cavity. Due to its small diameter, low-volume evacuation equipment does not have the ability to move enough air volume to be effective in eliminating aerosols. Although high-volume evacuation equipment can effectively capture and collect aerosols when deployed next to the cavitron tip, the tips are generally stiff and sharp, and the suction is quite high which means that high-volume evacuation equipment generally must be controlled by either a dental hygienist or dental auxiliary. This type of suctioning is not easy for a dental hygienist to handle independently while simultaneously managing other essential hygiene instruments. Further, heightened care and diligence must be exercised when handling high-volume evacuation equipment because delicate and loose unattached gingival tissue can be vacuumed into the tip of the high-volume evacuation equipment with potential injury and discomfort resulting to the patient. In view of the foregoing, there are extensive limitations associated with the existing prior art which fail to safely, effectively, and efficiently capture and evacuate aerosols before the aerosols escape the patient's oral cavity. While there are other devices promoted for the elimination or reduction of aerosols, they are generally utilized farther away from the point of aerosol generation, thereby increasing the risk that bacterial or viral particulates will reach a dental staff member or third party. Additional limitations of such devices include generating noise pollution, taking up valuable real estate within a dental office, interfering with access to the oral cavity, and involving a high financial expense. There are several intra oral devices that hold a dental mirror for visualization and also have vacuum ports to primarily eliminate liquids from the floor of the mouth though they are not as effective at doing so as a standalone Intra-oral high-volume evacuation equipment ("HVE") tip. There are also tongue and cheek retractors that are similarly being touted as the solution for aerosols because they are connected to a HVE hose but the problem is that the diameter of the HVE hose has been reduced significantly and the amount of air being moved is so restricted that they are not as effective as HVE tips.

Therefore, a need exists to overcome the problems with the prior art as discussed above.

SUMMARY OF THE INVENTION

The invention provides an aerosol deflecting dental shield and containment device and improvement relative to HVE devices that overcomes the hereinafore-mentioned disadvantages of the heretofore-known devices and methods. Specifically, the device facilitates more effective reduction of aerosol exposure within a dental office and to better protect the health and safety of dental hygienists, dental assistants, dentists, and patients alike, the present invention provides an aerosol deflecting dental shield and containment device that overcomes the heretofore-mentioned disadvantages of the heretofore-known devices and methods of this general type and that helps capture and collect aerosols released in or near an oral cavity while serving as a protective barrier to prevent a patient's tongue from coming into direct contact with dental drills and other tools during dental treatments and procedure.

With the foregoing and other objects in view, there is provided, in accordance with the invention and in combination with a HVE tip coupled to an evacuator vacuum-inducing assembly, an improvement that includes a cylindrical base with a lower free end and with a base sidewall enclosing and defining a base channel defining a base channel diameter and with the HVE tip disposed therein and coupled to the base sidewall, a circular base platform radially extending outwardly from the base channel, a deflecting member coupled to the circular base platform, with an outer surface opposing the lower free end, of an elastic polymeric material, defining an intake aperture fluidly coupled to the base channel, and defining a deflection diameter of a length at least twice a length of the base channel diameter, and a cantilevered tooth rest member projecting from the outer surface of the deflecting member, having a spherical apex disposed at a distal end thereon, and of an elastic polymeric material.

In accordance with another feature, an embodiment of the present invention includes the cylindrical base has a protuberance disposed on an inner surface of the base sidewall that defines the base channel, wherein the protuberance is disposed in an aperture of the HVE tip and is sized and shaped to retain the cylindrical base to the HVE tip.

In accordance with a further feature of the present invention, the outer surface of the deflecting member forms a concave shape and the deflecting member is rotatably coupled to the circular base platform and is operably configured to independent rotate at least 180° relative to the circular base platform.

In accordance with yet another feature, an embodiment of the present invention also includes the deflecting member having at least one flange directly and rotatably coupled to the circular base platform and operably configured to longitudinally retain the deflecting member relative to the circular base.

In accordance with an additional feature of the present invention, the deflecting member is disposed in a substantial 45° angle relative to a longitudinal axis spanning through a centroid defined by the base channel.

In accordance with a further feature, an embodiment of the present invention also includes the cantilevered tooth rest member defining an ejector channel extending from the spherical apex and that is fluidly coupled to the base channel.

In accordance with yet another feature, an embodiment of the present invention also includes cylindrical base further having an upper surface, wherein the outer surface of the deflecting member is offset a longitudinal length from the upper surface of the cylindrical base and the deflecting member having an outer edge defining a plurality of arcuate depressions disposed around a periphery of the outer edge to expose the upper surface of the cylindrical base.

In accordance with an exemplary feature of the present invention, the deflecting member defines a plurality of intake apertures fluidly coupled to the base channel.

In accordance with a further feature of the present invention, an aerosol deflecting dental shield and containment device is disclosed that includes a cylindrical base with an upper end, a lower free end, with a base sidewall having an inner surface enclosing and defining a base channel base channel defining a base channel diameter, and with a protuberance disposed on the inner surface of the base sidewall, a circular base platform radially extending outwardly from the base channel, a deflecting member coupled to the circular base platform, with an outer surface opposing the lower free end, of an elastic polymeric material, defining an intake aperture fluidly coupled to the base channel, and defining a deflection diameter of a length at least twice a length of the base channel diameter, and a cantilevered tooth rest member projecting from the outer surface of the deflecting member, having a spherical apex disposed at a distal end thereon, and of an elastic polymeric material.

Also in accordance with the present invention, an aerosol deflecting dental shield and containment device is disclosed that include a cylindrical base having an upper end, a lower free end opposing the upper end, a base sidewall separating the upper end and lower free end, the base sidewall defining a base channel and having a protuberance disposed thereon, and a base platform having a plurality of internal air channels disposed thereon and a deflecting member having an upper wall, an inner surface, an outer surface opposing the inner surface, a plurality of apertures disposed on the upper wall, a circular flange with a continuous outer edge, and a protruding tooth rest member having a spherical apex and a connecting support member with a member length separating the spherical apex and upper wall of the deflecting member.

In accordance with yet another feature, an embodiment of the present invention also includes an ejector channel disposed within the spherical apex and the connecting support member of the protruding tooth rest member.

In accordance with a further feature of the present invention, the deflecting member rotates 180° to 360° on an axis and the upper end of the cylindrical base is operably configured to form a 45° angle with the base sidewall.

In accordance with a further feature of the present invention, the deflecting member is operably configured to form a 45° angle with the base sidewall and the base platform is proportionately sized and shaped to receive the upper wall of the deflecting member.

Although the invention is illustrated and described herein as embodied in an aerosol deflecting dental shield and containment device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description. As used herein, the term "wall" is intended broadly to encompass continuous structures, as well as, separate structures that are coupled together so as to form a substantially continuous external surface.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the HVE tip or the connecting support member of the protruding tooth member.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 10-11 are side and rear cross-sectional and elevational views, respectively, of an aerosol deflecting dental shield and containment device in accordance with one embodiment of the present invention;

DETAILED DESCRIPTION OF THE INVENTION

Figure 1:
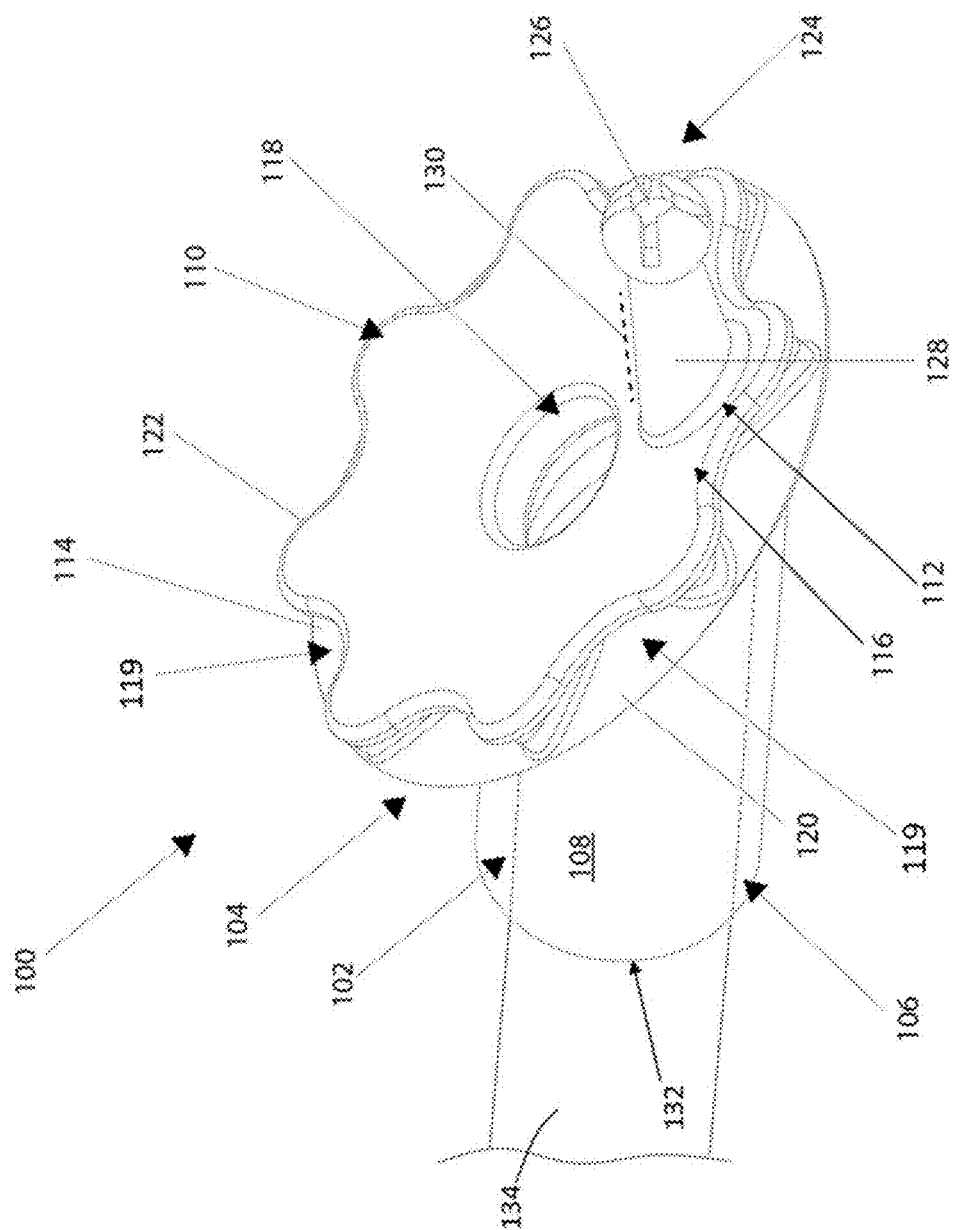
FIG. 1 is a perspective view of an aerosol deflecting dental shield and containment device in accordance with one embodiment of the present invention.
Figure 2:
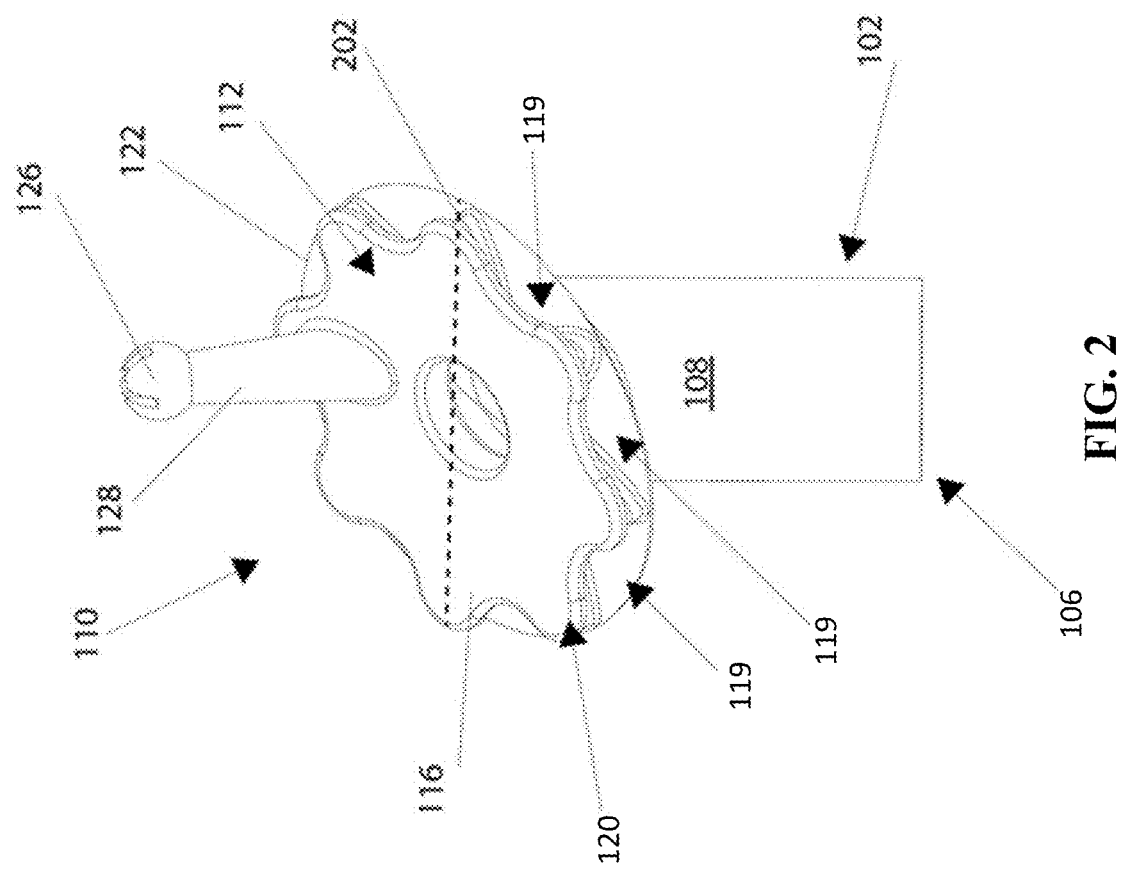
FIG. 2 is an elevational front view of an aerosol deflecting dental shield and containment device in accordance with one embodiment of the present invention.

The initial direction of flow of aerosols and liquids is influenced by the orientation of the source from which they are being generated. The tip of a cavitron, the air water spray from a dental drill, an evacuator vacuum-inducing assembly, and/or the spray from a three-way syringe are the primary sources discussed herein. All of these sources generate aerosols which drift into the reaches of the oral cavity where they can combine with its contents, including bacteria, viruses, or any debris which resides there. Generally, these laden liquids and aerosols could only previously be eliminated from the oral cavity by swallowing them, vacuuming them, or allowing them to drift through open lips into the environment. The lips and cheeks provide nature's primary containment shield that prevents the escape of liquids and aerosols into the environment. However, when lips are parted as during a dental procedure, liquids and aerosols have a significant route of escape. Laden liquids are denser than aerosols and they tend to flow in a stream or droplets with greater velocity. Their trajectory is more directly influenced by gravity, allowing them to fall back into the oral cavity, and are more readily eliminated by swallowing and vacuuming. However, a plume of aerosol is much less dense and flows like a cloud with less velocity, and the trajectory is more random. Aerosols are still influenced by the same gravity, but they become entrained with other air currents and can drift to great distances from their point of origination. By itself, the HVE's ability to entrain air, liquids and aerosols not only diminishes with greater distance from the generation point but also with the distance that these materials are peripheral to the long axis of the 10 mm aperture.

When a plume of aerosol is observed, it moves away from its point of generation in the shape of a rapidly expanding cone. When the plume is approached by a HVE tube it moves toward the vacuum and is eliminated almost entirely if the generation point and the HVE tip coincide. However, by the nature of many dental procedures, this is not possible. Often there is a tooth interposed between the generation point and the open tip of the HVE. The greater the distance between the two, the less effective the HVE is in eliminating the aerosol plume and liquids. When the HVE is observed, with its 10 mm aperture, slowly retreating from a plume of aerosol it appears to most effectively vacuum only the center portion of the aerosol cone, leaving the peripheral edges of the cloud relatively undisturbed and free to diffuse out of the oral cavity. When the aperture is moved toward the plume it eliminates not only the central portion of the plume, but also eliminates much of the peripheral portion of the plume before it can expand and potentially escape the oral cavity. In lieu of the opportunity to routinely position the HVE tip directly at the point of constant aerosol generation, the additional placement of a shield oriented 45 degrees to the long axis of the HVE bore greatly minimizes the escape of aerosols from the oral cavity. The shield slows and deflects the periphery of the plume that the HVE was not able to fully capture. Often there will be dentition interposed between the generation point and the face of the device. The key is to closely position the face of the device, mounted on the tip of the HVE, tangent to the direction of flow from the generation point. The HVE by itself, will in a large part eliminate the central portion of the plume; but it may not be totally effective in eliminating the entire plume. The present invention by itself will deflect and slow the diffusion of aerosols from the oral cavity. However, the plume by its ongoing nature and ever-expanding cloud may, in time, extend beyond the periphery of the face of the device. Although the face and HVE combined are more effective than each of these components standing alone, an even greater synergistic effect is possible.

The present invention provides a novel and efficient aerosol deflecting dental shield and containment device 100 (hereinafter referred to as "device 100" for brevity). Embodiments of the invention provide a device 100 that significantly reduces the quantity of aerosols released into the air from a dental patient's oral cavity during treatment and, in particular, during dental procedures, cleanings, and treatments. In particular, dental professionals in the industry face significant health and safety concerns stemming from the release and escape of aerosols from a patient's oral cavity during dental treatments. Because dental hygienists, dental assistants, and dentists must be in relatively close proximity to a patient's open oral cavity during dental procedures and treatments, the foregoing dental professionals face an acute risk of infection from viruses, bacteria, and other pathogens that can quickly and easily travel from a patient's oral cavity to the dental professionals' nasal or oral cavities. Particularly in the wake of the COVID-19 pandemic, the health and safety of dental professionals, as well as the safety deficiencies of existing dental tools and equipment, has gained greater care and attention.

Existing prior art is characterized by extensive limitations which do not adequately meet the health and safety concerns of dental professionals and/or that do not pose a feasible and practical option for dental professionals in their day-to-day duties. Low-volume evacuation equipment must be submerged in the liquid, e.g., saliva or excess water, to effectively suction and collect the liquid. Because the aerosols generated by ultra-sonic scaling instruments and other dental equipment are in the form of minute solid particles or liquid droplets appearing as a fine spray or gas, low-volume evacuation equipment generally fails to capture and collect aerosols. Said differently, a low-volume evacuation tool is typically not the appropriate tool to utilize in attempting to capture escaping aerosols.

HVE more effectively captures and collects escaping aerosols, but its use has significant drawbacks which makes this an impractical, unfeasible, and inconvenient option for dental professionals. Specifically, HVE generally must be controlled by either a dental hygienist or dental auxiliary as it requires some skill to safely and effectively suction with, and control, an HVE tip. Dental hygienists must carefully maneuver HVE systems while simultaneously managing other essential hygiene instruments within the patient's oral cavity. Accordingly, intra-oral, HVE systems take up valuable real estate in the dental professional's hands, which real estate could be used for handling other required dental tools or equipment. Further, heightened care and diligence must be exercised when handling HVE systems because delicate and loose unattached gingival tissue may be vacuumed into the tip of the HVE equipment or loose gingival tissue may be cut or scraped on the tips of the HVE which are generally stiff and sharp, with potential injury and discomfort resulting to the patient. As a result of the foregoing, it is not recommended for HVE equipment to be maneuvered by the patients themselves and, unlike low volume saliva ejectors which are merely bent into a hook and hung in the corner of patients' cheeks, such equipment may not be gently propped within the patient's oral cavity and left unmanned.

Personal protective equipment ("PPE") such as dental face masks, goggles, and face shields do not fully preclude the risk of contamination or infection from aerosols and may be bulky, heavy, or uncomfortable to wear while providing dental care to patients. The present invention is not intended as a substitute for PPE; however; PPE is still necessary and offers an additional, if not primary, layer of protection. Other potential options for reducing or eliminating aerosols include extra-oral high-volume evacuation equipment such as stand-alone chairside air extraction devices which are not only costly and noisy, but also take up a significant amount of space within a dental office. Further, stand-alone chairside air extraction devices may reduce aerosols that have already escaped the patient's oral cavity but do not capture the aerosol close to the point of generation, i.e., the patient's mouth. Because aerosols are more effectively captured close to the point of generation, the ideal solution is a tool that can be used within the patient's oral cavity while remaining both feasible and practical to handle.

The device 100 depicted in FIG. 1 functions as an efficient, feasible, and practical alternative to existing prior art for the capture and collection of aerosols generated by dental tools and equipment. The device 100 is operably configured and designed to be used as an adjunct to traditional HVE tips (best depicted and exemplified in FIG. 1 and FIG. 4 with numeral 134) to beneficially utilize the high-volume evacuation and suctioning capabilities offered by HVE systems. As interchangeably referenced herein, "HVE equipment" or "HVE tip" refers to a heavy-duty hose about 15-19 mm in diameter, that is fitted with an on/off valve that also receives a standard 12-13 mm plastic tube with a 10 mm internal diameter and providing approximately 10 bar vacuum at its tip. The structure and design of the device 100 helps allay the majority of the shortcomings associated with HVE equipment such as, without limitation, the stiff and sharp HVE tips. Further, the tooth rest member makes the device easier to stabilize in the patient's mouth by the hygienist, the dental assistant, the dentist and perhaps even the patient themselves. Additionally, the plurality of apertures disposed on the device is spread out over a larger area, as opposed to the traditional HVE tip; therefore, the soft tissues (unattached gingiva) are far less at risk of being suctioned and injured, and perhaps even safe enough to allow the patient to maneuver independently.

As depicted in FIGS. 1 and 11, the device 100 comprises a substantially cylindrical base 102 having an upper end 104, a lower free end 106 opposing the upper end 104, a base sidewall 108 separating the upper end 104 and lower free end 106, the base sidewall 108 defining a base channel 132 and having at least one protuberance 1100 disposed on an inner surface of the base sidewall 108, and a base platform 120 or flange member relative to the outer diameter of the base sidewall 108. The upper end 104 of the base 102 defines an internal aperture that is fluidly coupled to one or more internal air channels or intake apertures 118 defined by the base platform 120. Said another way, the base platform 120, which may also serve as a deflecting member 110 for blocking aerosols, may define a plurality of apertures on an outer surface 116 thereon that form or enable a conduit for suction of aerosols proximal to the outer surface 116 through the device 100 and to a HVE tip 134.

Figure 14:
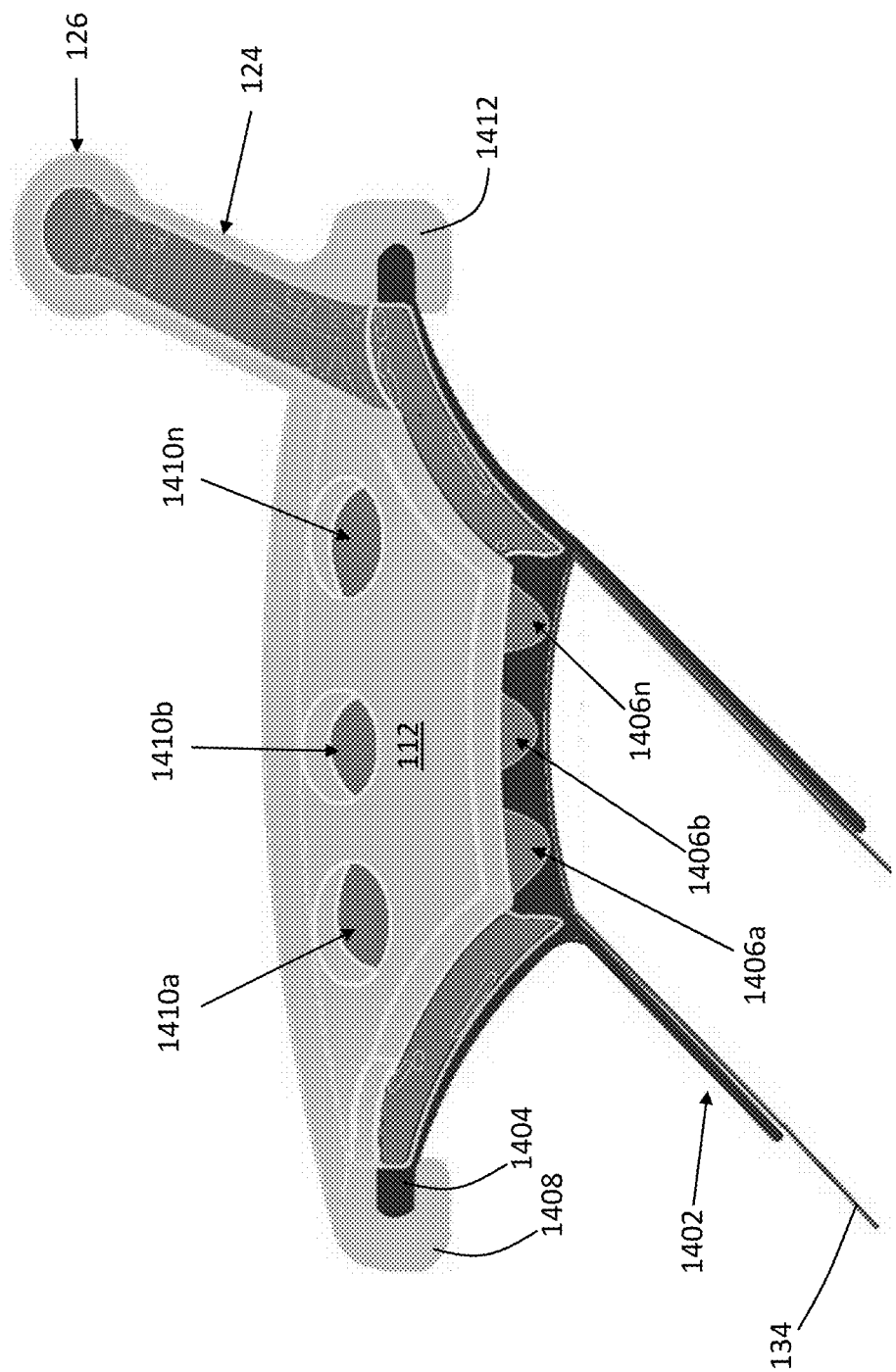
FIG. 14 is a perspective view of a deflecting member, cantilevered tooth rest member, and circular base of an aerosol deflecting dental shield and containment device in accordance with one embodiment of the present invention.
Figure 15:
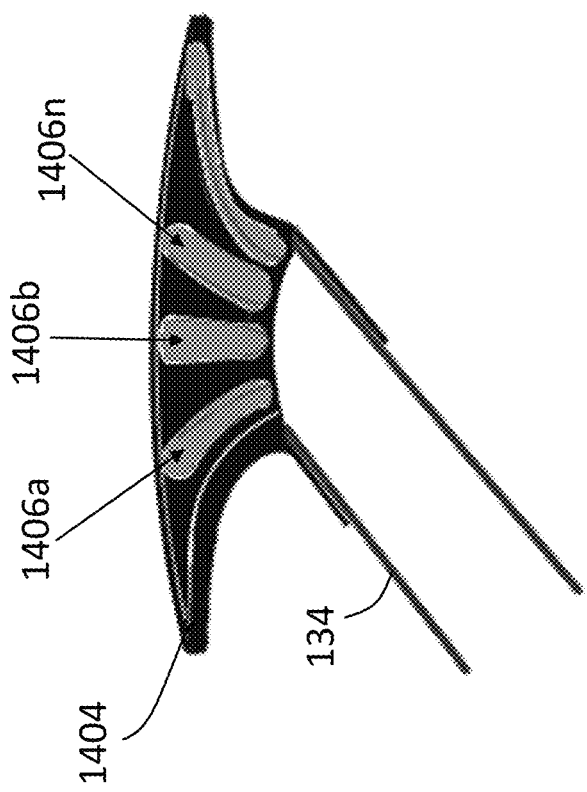
FIGS. 15-16 are elevational transparent views of the deflecting member, the cantilevered tooth rest member, and the circular base of an aerosol deflecting dental shield and containment device of FIG. 14.
Figure 16:
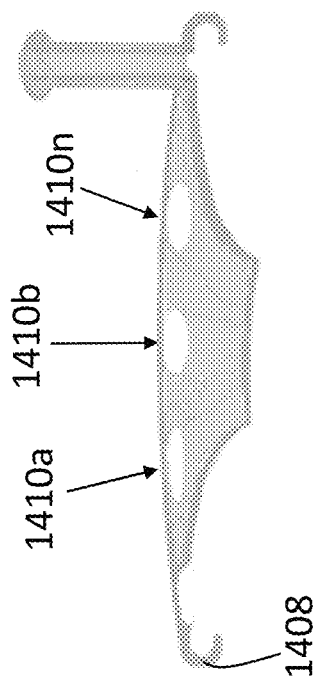

In one embodiment, as best seen in FIGS. 14-16, the device may include a base 1402 attached to a HVE tip 134 and a base platform 1404 defining a plurality of internal air channels 1406a-n, wherein "n" refers to any number greater than one, disposed thereon. The device may also include a separate deflecting member 1408 that is selectively couplable and uncouplable to the base platform 1404 and defines the outer surface and the apertures 1410a-n that intake aerosols through the device and into the HVE tip 134. When formed as separate components, the deflecting member 1408 may be coupled to the base platform 1404 with formed C-shaped edges sized to contour the outer side edges of the base platform 1404 and be retained thereon with the apertures 1410a-n disposed in an overlapping configuration with the internal air channels 1406a-n. The deflecting member 1408 may also be selectively rotatable relative to the base platform 1404. In other embodiments, the base platform, deflecting member, and/or base are formed as a single monolithic unitary structure.

Figure 3:
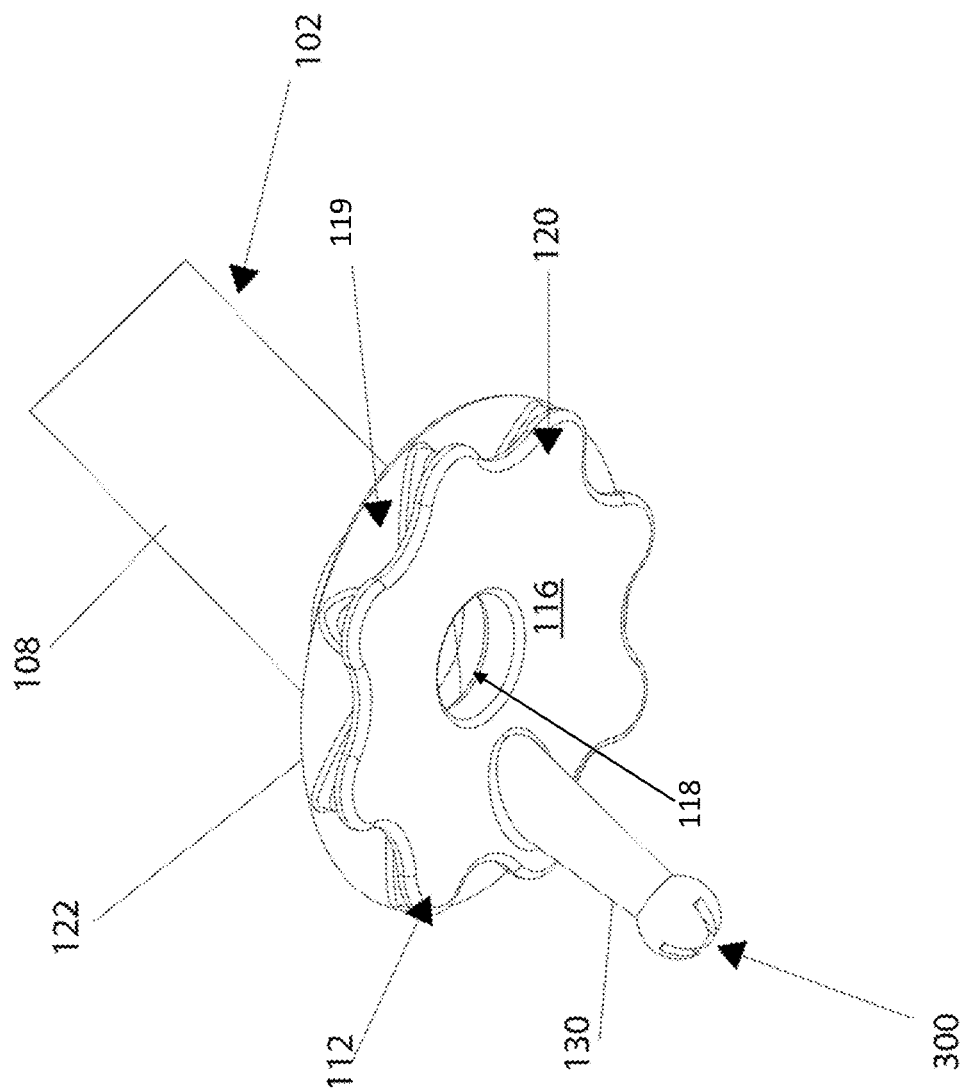
FIG. 3 is another elevational front view of an aerosol deflecting dental shield and containment device in accordance with one embodiment of the present invention.
Figure 4:
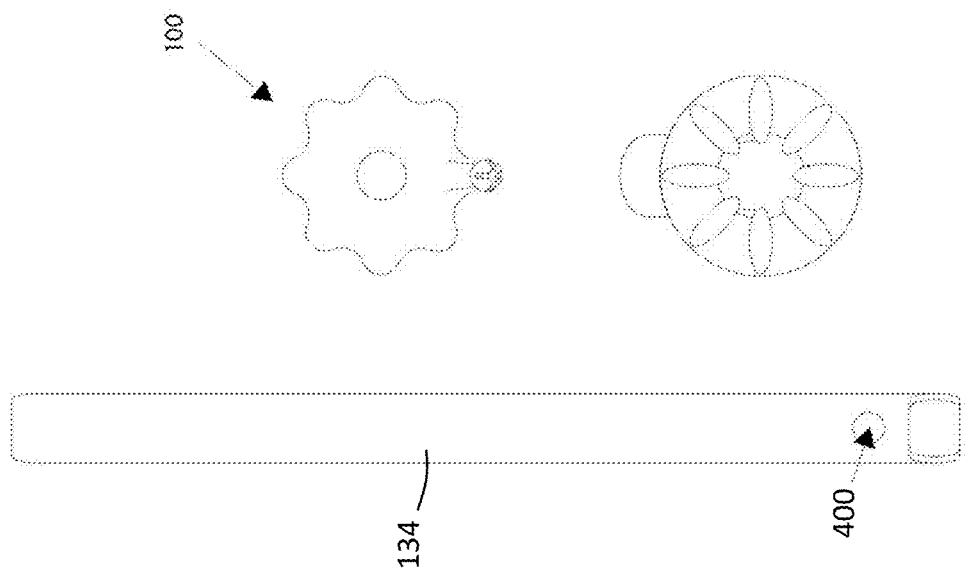
FIG. 4 is a front elevational view of an HVE tip and top plan views of a deflecting member and circular base platform upon which the deflecting member may rotate in accordance with one embodiment of the present invention.
Figure 5:
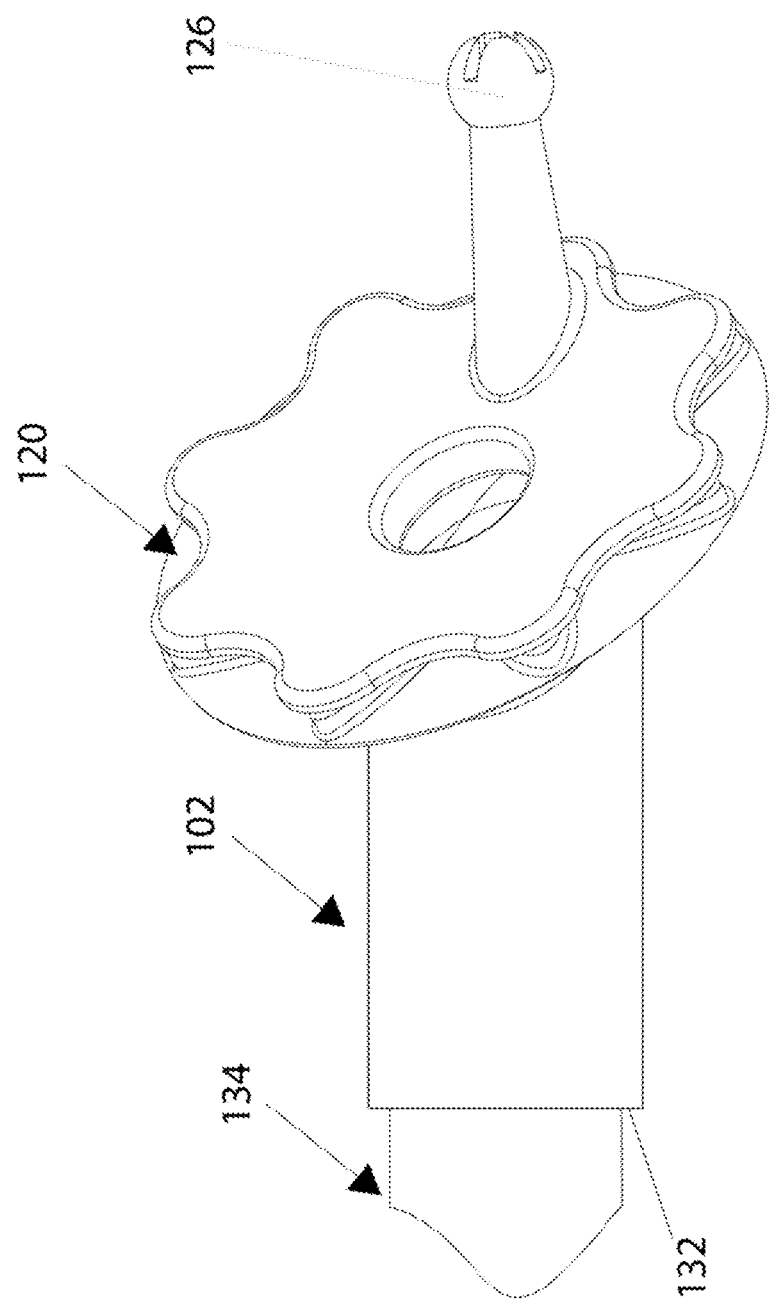
FIG. 5 is a side elevational view of an aerosol deflecting dental shield and containment device attached to an HVE tip in accordance with one embodiment of the present invention.

Referring back to FIG. 1 and FIG. 11, in combination with FIGS. 2-5, the lower free end 106 and base channel 132 defined by the base 102 provide the structure to receive the HVE tip 134. The lower end 106 is "free" in that it is not permanently and structurally attached to any corresponding structure, i.e., it is operably configured to receive and couple with the upper end or portion of the HVE tip 134. To utilize the device 100, a user must exert a force (e.g., 11 bf) onto the HVE tip 134 or device 100 sufficient to slip the HVE tip 134 into the base channel 132 and lock or otherwise retain the device 100 in place by juxtaposing the protuberance 1100 of the substantially cylindrical base 102 onto the side vent 400 of the HVE tip 134 (as best seen in FIG. 4 and FIG. 11). The protuberance 1100 of the substantially cylindrical base 102 enters and blocks the side vent 400 of the HVE tip 134. In further embodiments, the elasticity of the material of the base 102 allows for the base 102 to be expanded and generate a compression force on the HVE tip 134. In a preferred embodiment, the protuberance 1100 of the substantially cylindrical base 102 has a size, shape, and dimensions that are proportionate to the side vent 400 of the HVE tip 134 to facilitate a flush configuration between the inner surface of the base 102 and the outer surface of the HVE tip 134 when the protuberance 1100 enters the side vent 400 of the HVE tip 134. In an exemplary embodiment, the substantially cylindrical base 102 is of a transparent or translucent polyurethane composition measuring approximately 60° Shore A on the Durometer Shore Hardness Scale or of another comparable polymeric composition (e.g., nitrile rubber, ethylene propylene rubber, polypropylene, etc.) with similar rigidity and toughness properties.

In accordance with a further feature of the present invention, the device 100 further comprises a deflecting member 110 may include an upper wall 112 or outermost surface 116 that is raised relative to a surface 114, and one or more aperture(s) 118a-n defined by the upper wall 112 or on the outer surface 116. In one embodiment, one of the apertures 118 is centrally located the upper wall 112 or outer surface 116. Said another way, the central aperture 118 is located (at least partially, but preferably, concentrically) on the geometric center of the outer surface 116 that is defined by the outer edge 122. The device 100 also beneficially includes a protruding tooth rest member 124 with a spherical apex 126 and a connecting support member 128 with a member length 130 separating the spherical apex 126 and upper wall 112 of the deflecting member 110. The upper wall 112 and outer surface 116 of the deflecting member 110 face outwardly away from the device 100 and may come into direct physical contact with a patient's tooth, gingival tissue, or oral cavity during use. The deflecting member 110 may also beneficially define a plurality of circular or acuate recesses 119 that span radially and inwardly from an outer edge of the base platform 120 toward the central aperture 118, thereby providing a resting surface for one or more of a user's teeth while still providing an aerosol barrier with the base platform 120. To that end, the outer surface 116 defines the arcuate portions of the deflecting member 110 are preferably raised approximately 5-17 mm above the outer surface of the base platform. The outer surface 116 of the upper wall 112 may also be formed of a concave shape to facilitate in transporting aerosols to the aperture(s) 118. Said another way, the outer surface 116 of the deflecting member 110 is offset a longitudinal length from the upper surface of the cylindrical base 120. The deflecting member 110 has an outer edge 122 defining a plurality of arcuate depressions 119 disposed around a periphery of the outer edge 112, wherein the upper surface 114 of the cylindrical base 120 is exposed by said arcuate depression 119, thereby enabling teeth of a user to be inserted therein and rest on either or both the outer edge 112 and the upper surface 114.

Figure 6:
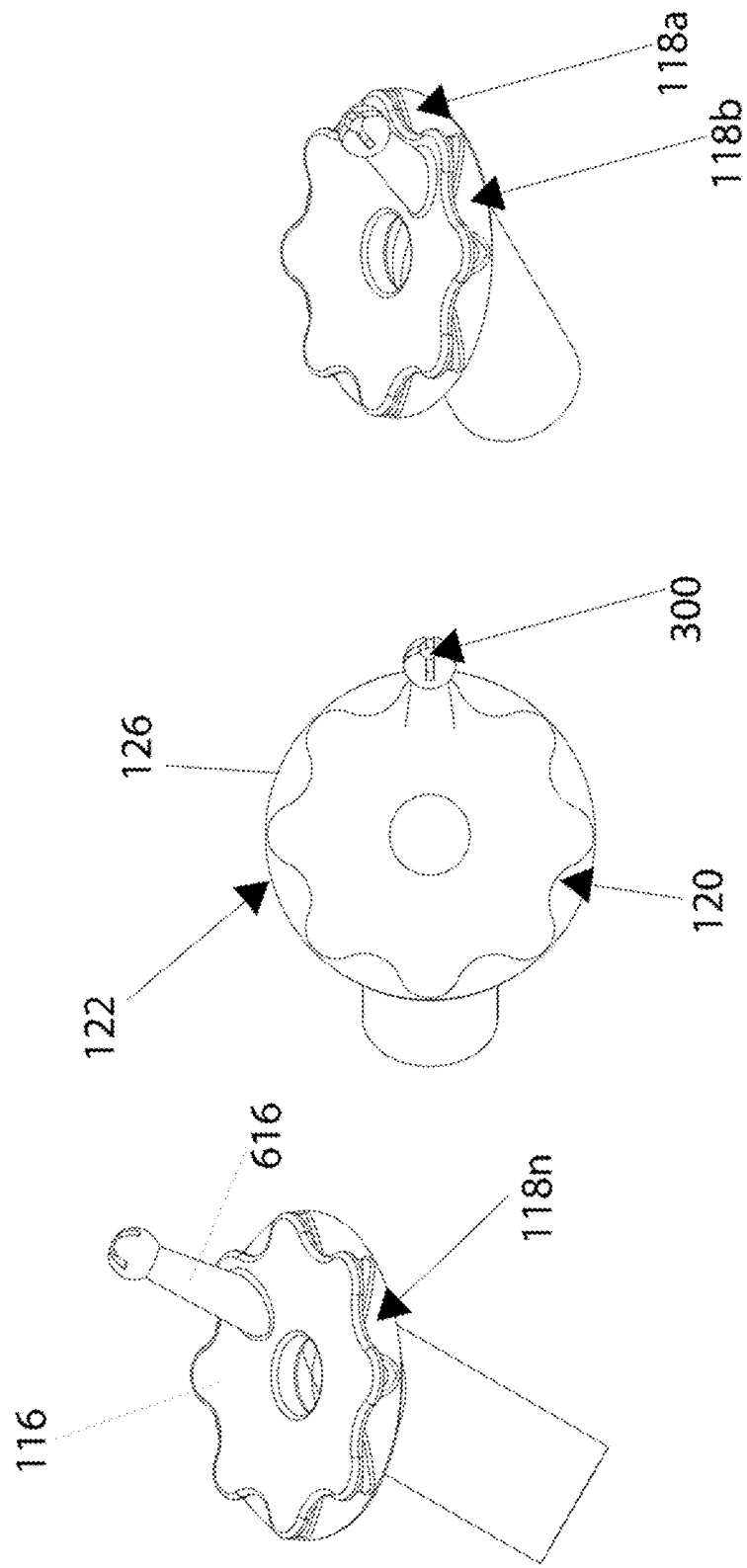
FIG. 6 depicts perspective views of an aerosol deflecting dental shield and containment device in accordance with one embodiment of the present invention.
Figure 7:
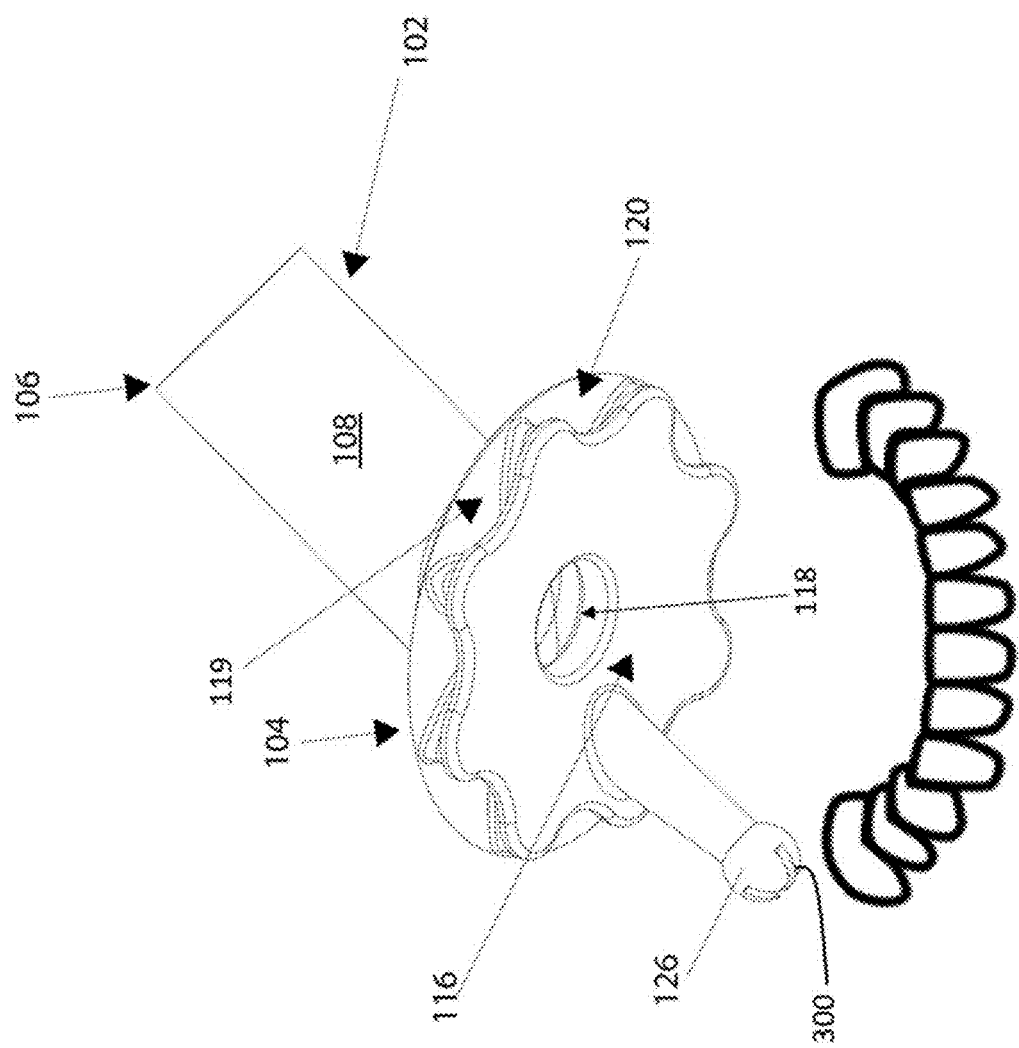
FIG. 7 depicts a perspective view of an aerosol deflecting dental shield and containment device utilized in connection an exemplary diagram of a patient's teeth in accordance with one embodiment of the present invention.
Figure 9:
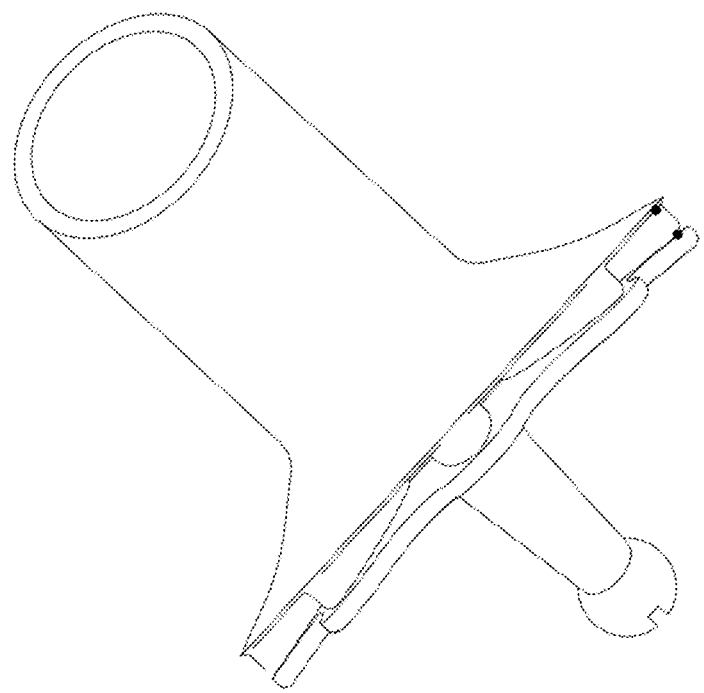
FIGS. 8-9 are elevational views of an aerosol deflecting dental shield and containment device in accordance with one embodiment of the present invention.
Figure 8:
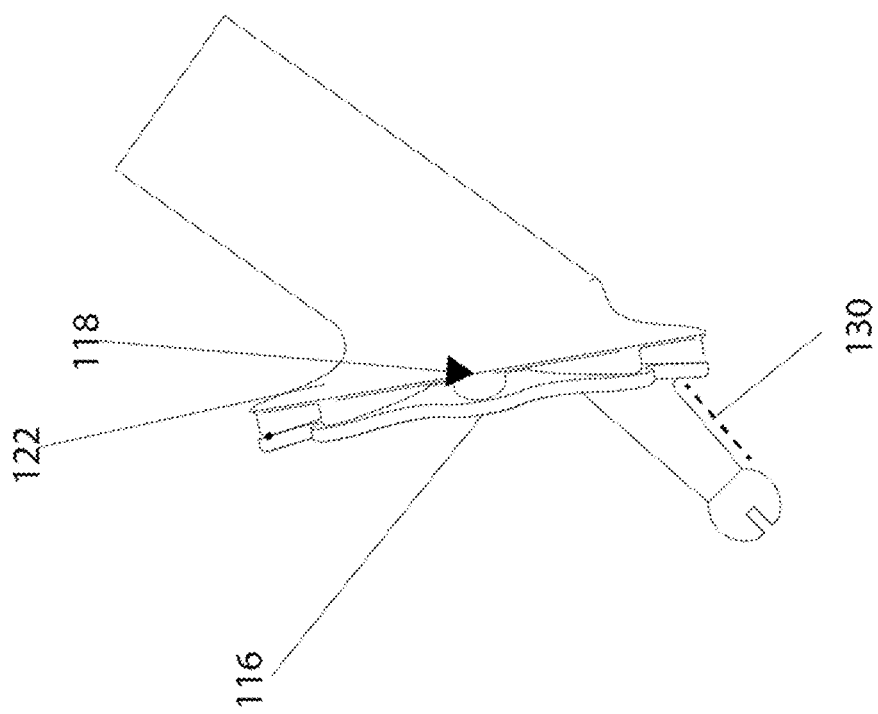

Although the device 100 depicted in FIGS. 1-13 depicts a single aperture 118, a plurality of apertures 118a-n may be defined by the deflecting member 110 and that are operably configured to receive the flow of liquid and aerosols being suctioned or vacuumed from within the patient's oral cavity. In various embodiments, the plurality of apertures 118a-n may vary in diameter between approximately 1-3.5 mm so as to be wide enough to effectively suction and capture released aerosols while remaining proportionately sized relative to the overall size and diameter of the device 100. The device 100 has an outside diameter ranging approximately between 12-26 mm and an inside diameter ranging approximately between 10-15 mm. During use, the high suction from the HVE system and HVE tip 134 draws the released aerosols into the aperture(s) 118a-n, where the aerosols then enter the base channel 132 and HVE tip 134 and are collected within the HVE system. By creating a series of internal channels within the device 100, via the plurality of apertures 118a-n and the plurality of internal air channels 1104a-n, which independently lead to the centrally located HVE tip aperture, a more effective level of aerosol elimination is achieved. Additionally, with reference to FIG. 1 and FIG. 6, it can be seen that the base platform 120 radially extends from the base sidewall 108 and in a direction outwardly from the base channel 132. Further, the 112 upper wall and the upper surface of the base platform 120 can be seen collectively defining the plurality of apertures 118a-n around the deflecting member 110 and the internal air channels (like those depicted in FIG. 11). Each of the internal channels span inwardly from the plurality of apertures 118a-n, respectively, in a direction toward the base channel and are fluidly coupled to the base channel 132.

The base platform 120 and deflecting member 110 function as a deflecting shield to significantly prevent aerosols from escaping the patient's oral cavity and to restrict the free movement of aerosols to a proximity near the point of aerosol generation. In one embodiment, the deflecting member 110 may be substantially convex or planar. In an alternate embodiment, the deflecting member 110 may be substantially concave. Depending on how the device 100 is used, e.g., the dental tools being utilized, the type of liquid or aerosol being generated, etc., the planar, convex, and concave forms of the deflecting member 110 may more effectively reduce the quantity of aerosols escaping from the oral cavity than other alternate forms. In a preferred embodiment, the diameter 202 of the deflecting member 110 ranges between approximately 20-30 mm. By increasing the diameter 202 of the deflecting member 110 to approximately double or triple the diameter of the HVE tip 134, the deflecting member 110 can effectively reduce the aerosols as well as, or better than, the HVE system standing alone, while being placed at a reasonable distance from the point of aerosol generation. The wide diameter 202 of the deflecting member 110 serves the dual function of deflecting aerosols and reducing their unfettered permeation into the remainder of the dental office while also functioning as a protective barrier to prevent a patient's tongue from coming into close proximity or physical contact with the dental drill or other tool being used on the patient's teeth.

Traditionally, dental assistants have had to use one hand to maneuver the HVE tip 134 to evacuate liquids and aerosols while using the other to support a mirror to retract and protect soft issue within the oral cavity. The device 100 combines both capabilities into one tool thereby significantly improving upon existing prior art in the dental field. Said differently, the device 100 enables a dental auxiliary to effectively evacuate aerosols and protect a patient's tongue while also providing a mechanism to better protect the health and safety of dental staff. The dental assistant can stabilize the device 100 by using the tooth rest member 124 to support the device 100, thus allowing for a one-handed operation. Instead of something sharp which cannot comfortably rest against delicate tissue, the device 100 provides a soft plastic and/or elastomeric alternative, i.e., rubber tooth rest to rest on either teeth or other firm tissue adjacent to the teeth. This tooth rest could also offer enough stability that some patients may be able to aid the hygienist by holding the HVE tube in their hand and supporting the device 100 via the tooth rest member 124 as directed by the hygienist. In this way the hygienist has great aerosol evacuation and has both hands free to operate both the ultrasonic scalar and mouth mirror. This also may allow the ultrasonic procedure to be carried out without needing an additional dental auxiliary to vacuum with a HVE tip, as the patient can do it instead. Also, since the vacuum is spread out over such a wider area, there is less danger of sucking up delicate tissue if perhaps the patient were to close their lips around the device 100.

In one exemplary embodiment, the deflecting member 110 is of a transparent or translucent silicone rubber composition, i.e., an elastomeric, polymerized silicone or polysiloxane composition, measuring approximately 40° Shore A on the Durometer Shore Hardness Scale. The transparent or translucent quality of the deflecting member 110 allows dental hygienists, dental assistants, and dentists to maintain a clear line of sight to dental tools or equipment being used in the oral cavity as well as to a patient's teeth, tongue, and gingival tissue, as needed during dental procedures and treatments. The polysiloxane composition and Shore Hardness Value of the deflecting member 110 are significant in that they ensure the deflecting member 110 is soft enough that it cannot easily injure loose or soft gingival tissue in the oral cavity the way that the traditionally rough HVE tips 134 do. Further, the silicone rubber composition allows a user to slip the device 100 more easily over the HVE tip 134 and to snugly position the device 100 into place. This composition ensures the device 100 remains in position on the HVE tip 134 without substantial movement therefrom. The diameter of the outer surface 116 of the deflecting member 110 ranges between approximately 25-30 mm in exemplary embodiments, though the area may be vary in alternate embodiments.

In accordance with another feature of the present invention, the protruding tooth rest member 124 comprises the spherical apex 126 and the connecting support member 128. The spherical apex 126 functions as a tooth rest for dental professionals, whereby the spherical apex 126 can be propped on a patient's tooth, thereby supporting and propping up the entire device 100 within the patient's oral cavity. This functionality beneficially provides dental professionals with the opportunity to free up one of their hands to use another dental tool or to grab another item they may need during a dental procedure or treatment, facilitating reduced arm fatigue and added stability. Notably, the form and composition of the spherical apex 126 makes this functionality possible because the silicone rubber composition of the spherical apex 126 allows the device 100 to gently sit in a patient's oral cavity (or to be handled or held by a patient) without roughly suctioning loose gingival tissue or otherwise scraping or injuring the soft tissue within a patient's mouth.

In one embodiment, and as best depicted in seen in FIG. 3, an ejector channel 300 is disposed within the spherical apex 126 and the connecting support member 128 of the protruding tooth rest member 124. The ejector channel 300 being interconnected with the base channel 132 and operably configured to receive the suctioned liquid from the oral cavity. Said differently, suctioned liquid may be received by the ejector channel 300 in the spherical apex 126, fluidly transported to the ejector channel 300 in the connecting support member 128 and egressed via the base channel 132 of the substantially cylindrical base 102. The suctioning power provided by the ejector channel 300 of the spherical apex 126 is largely equivalent or comparable to that of low-volume evacuation equipment, meaning the spherical apex 126 may be used as a standard saliva ejector with low volume suctioning. The low volume suctioning provided by the ejector channel 300 of the spherical apex 126 can beneficially capture and collect pooling liquids, e.g., saliva, from an oral cavity but has insufficient suctioning capabilities to capture and collect aerosols therefrom. The one or more intake aperture(s) 118 disposed on the periphery of the upper wall 112 of the deflecting member 110 redistribute the air flow from the HVE tip 134 over a wider area and eliminate the aerosols into the HVE. The cantilevered tooth rest member 124 can be seen projecting from the outer surface 116 of the deflecting member 110, having a spherical apex disposed at a distal end thereon.

Over time, saliva and water pool toward the soft palate and must be eliminated for the patient's comfort. Traditionally, this is either done with an HVE tip or a low volume suction. The hollow tooth rest member 124, however, allows for comfortable suctioning against the soft palate. In preferred embodiments, the diameter of the ejector channel 300 ranges between approximately 4-8 mm. The tooth rest member 124 may allow the patient to hand hold the device independently under the direction of the hygienist for the purpose of eliminating aerosols and vacuuming saliva and debris. The tooth rest member 124 offers the dental assistant the ability to do the same functions while also providing a way to balance the device 100 with greater stability than the traditional HVE device. Additionally, it gives better stability in shielding the wandering tongue from the dental drill in certain procedures. Due to the hollow design, the tooth rest member 124 also provides a means to suction saliva and water from the back of the oral cavity where the tongue and soft palate meet.

In one embodiment, the connecting support member 128 forms an obtuse angle relative to a majority of the outer surface 116 of the deflecting member 110, thereby enabling the device 100 to reach deeper areas of the oral cavity and to facilitate greater maneuverability of the device 100 within the oral cavity. Said differently, the connecting support member 128 extends outwardly from the outer surface 116 of the deflecting member 110 in an orientation and direction away from the where the central aperture 118 is located (seen, for example, in FIG. 7). The connecting support member 128 may also extend in substantially the same direction and orientation as the longitudinal direction HVE tip 124 and/or cylindrical base 102.

Figure 12:
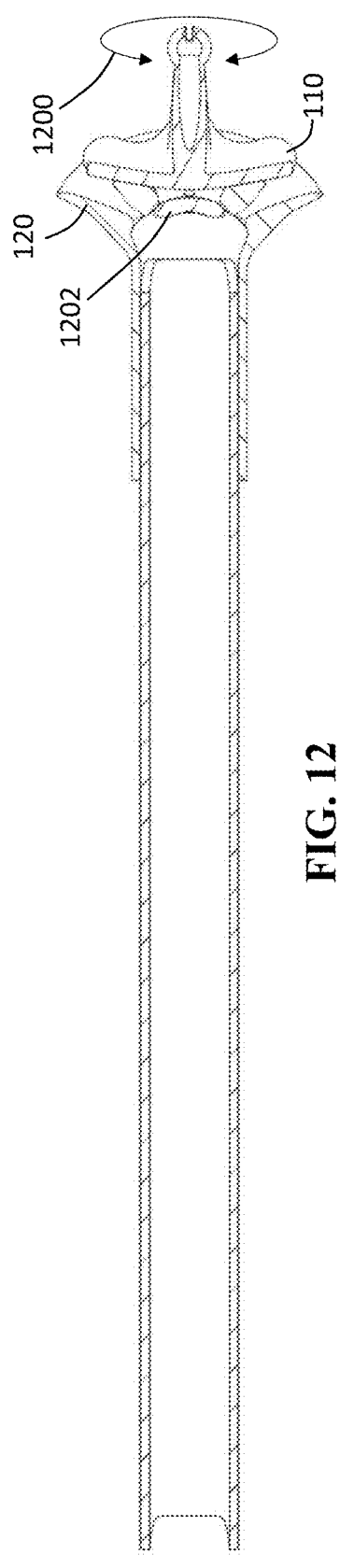
FIGS. 12-13 are front cross-sectional and elevational views, respectively, of an aerosol deflecting dental shield and containment device in accordance with one embodiment of the present invention.
Figure 13:
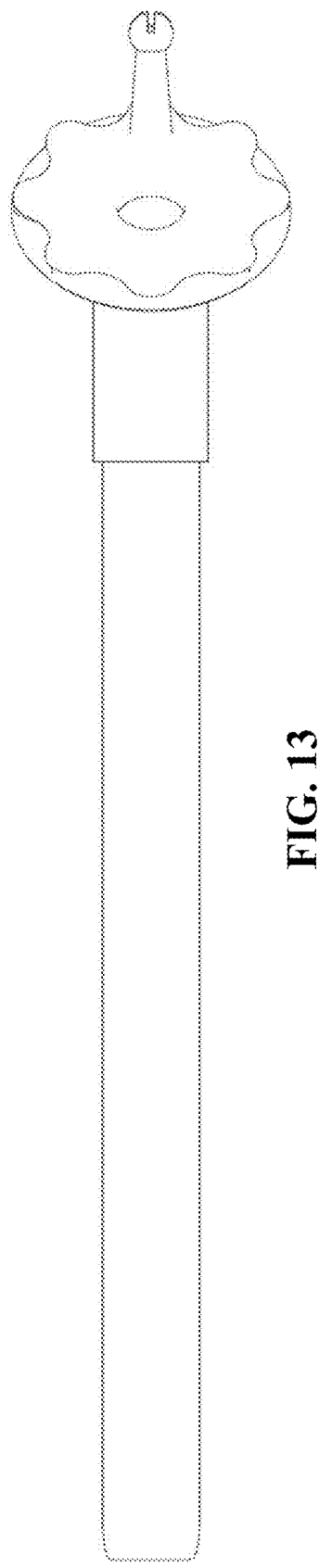

In accordance with one embodiment, the base platform 120 is proportionately sized and shaped to receive a portion of the upper wall 112 of the deflecting member 110. Said another way, the deflecting member 110 is rotatably coupled to the circular base platform and is operably configured to independent rotate (exemplified with arrow 1200 in FIG. 12) at least 180° relative to the circular base platform 120. In preferred embodiments, the deflecting member 110 rotates 180° to 360° on an axis which allows for greater ease of use by dental professionals and for greater comfort when the device 100 is propped inside a patient's oral cavity. Specifically, a 360° rotational capability allows the protruding tooth rest member 124 to be positioned such that the entirety of the deflective member 110 is in the most advantageous position, depending on the location of where the aerosol is being generated in the oral cavity, to suction and vacuum all or substantially all of the aerosols being generated at the point of generation. The tooth rest member 124 may be operably positioned to support the device 100 steadily in the location it is needed, close to the aerosol generation point, and in doing so the tooth rest member 124 steadily supports the deflecting member 110 so the one or more aperture(s) 118 are best exposed to the proximity of the aerosol generation point. As best seen in FIG. 12 and FIG. 14, the deflecting member 110 includes at least one flange (e.g., flanges 1202, 1412) directly and rotatably coupled to the circular base platform 120 and operably configured to longitudinally retain (absent an external force of approximately 1-31 bf) the deflecting member 110 relative to the circular base 120.

The deflecting member 110 and the upper end 104 of the cylindrical base 102 may form a 90° angle with the base sidewall 108. In alternate embodiments, as best shown in FIGS. 10-11, the deflecting member 110 may be operably configured to form a 45° angle relative to the longitudinal direction or axis of the base 102 and/or HVE tip 134. The substantial 45° angle (+/−10°) beneficially enables the device 100 to reach deeper areas of the oral cavity and/or angle the deflecting member 110 to capture aerosols. Said another way, the deflecting member is disposed in a substantial 45° relative to a longitudinal axis spanning through a centroid defined by the base channel 132. The cantilevered tooth rest member 124 defines an ejector channel 300 extending from the spherical apex 126 and fluidly coupled to the base channel 132.

FIGS. 10-11 depict several elevational views of the device 100 mounted on an HVE tip 134 with a protuberance 1100. The device 100 can be seen having the ejector channel 300 and the base platform 120. The base platform 120 may be proportionately sized and shaped to receive a portion of the deflecting member 110. When strategically positioned, the device 100 provides an additional artificial shield to slow and deflect the flow of both liquids and aerosols back into the oral cavity. In addition, the device's internal and external design along with its close proximity to the powerful HVE tube, provides a synergistic combination to better reduce the escape of aerosols. The deflecting member 110 may be fully rotatable on the base platform 120 to allow the user to position the tooth rest member 124 in the ideal position for the different quadrants of the mouth. This feature allows the device 100 to be stabilized in a way that supports the deflecting member 110 with maximum exposure toward the point of aerosol generation.

What is claimed is:

1. In combination with a HVE tip operably configured to be coupled to an evacuator vacuum-inducing assembly, the improvement comprising:
   a cylindrical base having a lower free end and having a base sidewall enclosing and defining a base channel defining a base channel diameter and with the HVE tip disposed therein and coupled to the base sidewall;
   a circular base platform radially extending outwardly from the base channel;
   a deflecting member coupled to the circular base platform, having an outer surface opposing the lower free end, of an elastic polymeric material, defining an intake aperture fluidly coupled to the base channel, and defining a deflection diameter of a length at least twice a length of the base channel diameter; and
   a cantilevered tooth rest member projecting from the outer surface of the deflecting member, having a spherical apex disposed at a distal end thereon, and of an elastic polymeric material.

2. The improvement according to claim 1, wherein the cylindrical base further comprises:
   a protuberance disposed on an inner surface of the base sidewall that defines the base channel, wherein the protuberance is disposed in an aperture of the HVE tip and is sized and shaped to retain the cylindrical base to the HVE tip.

3. The improvement according to claim 1, wherein:
   the outer surface of the deflecting member forms a concave shape.

4. The improvement according to claim 1, wherein:
   the deflecting member is rotatably coupled to the circular base platform and is operably configured to independent rotate at least 180° relative to the circular base platform.

5. The improvement according to claim 4, wherein the deflecting member further comprises:
   at least one flange directly and rotatably coupled to the circular base platform and operably configured to longitudinally retain the deflecting member relative to the circular base.

6. The improvement according to claim 1, wherein:
   the deflecting member is disposed in a substantial 45° angle relative to a longitudinal axis spanning through a centroid defined by the base channel.

7. The improvement according to claim 1, wherein the cantilevered tooth rest member defines an ejector channel extending from the spherical apex and fluidly coupled to the base channel.

8. The improvement according to claim 1, wherein the cylindrical base further comprises an upper surface, wherein the outer surface of the deflecting member is offset a longitudinal length from the upper surface of the cylindrical base and the deflecting member having an outer edge defining a plurality of arcuate depressions disposed around a periphery of the outer edge to expose the upper surface of the cylindrical base.

9. The improvement according to claim 1, wherein the deflecting member defines a plurality of intake apertures fluidly coupled to the base channel.

10. An aerosol deflecting dental shield and containment device comprising:
    a cylindrical base having an upper end, having a lower free end, having a base sidewall having an inner surface enclosing and defining a base channel defining a base channel diameter, and having a protuberance disposed on the inner surface of the base sidewall;
    a circular base platform radially extending outwardly from the base channel;
    a deflecting member coupled to the circular base platform, having an outer surface opposing the lower free end, of an elastic polymeric material, defining an intake aperture fluidly coupled to the base channel, and defining a deflection diameter of a length at least twice a length of the base channel diameter; and
    a cantilevered tooth rest member projecting from the outer surface of the deflecting member, having a spherical apex disposed at a distal end thereon, and of an elastic polymeric material.

11. The aerosol deflecting dental shield and containment device according to claim 10, wherein:

the deflecting member is rotatably coupled to the circular base platform and is operably configured to independent rotate at least 180° relative to the circular base platform.

12. The aerosol deflecting dental shield and containment device according to claim 10, wherein the cantilevered tooth rest member defines an ejector channel extending from the spherical apex and fluidly coupled to the base channel.

13. An aerosol deflecting dental shield and containment device comprising:
- a cylindrical base having an upper end, having a lower free end opposing the upper end, having a base sidewall separating the upper end and lower free end of the cylindrical base, the base sidewall defining a base channel and the base sidewall having a base platform radially extending therefrom and in a direction outwardly from the base channel, the base platform having an upper surface; and
- a deflecting member:
  - coupled to the base platform;
  - having an upper wall defining, together with the upper surface of the base platform, a plurality of apertures and internal air channels each spanning inwardly from the plurality of apertures, respectively, in a direction toward the base channel, the internal air channels fluidly coupled to the base channel; and
- a protruding tooth rest member having a spherical apex and a connecting support member with a member length separating the spherical apex and upper wall of the deflecting member.

14. The aerosol deflecting dental shield and containment device according to claim 13, further comprising:
- an ejector channel disposed within the spherical apex and the connecting support member of the protruding tooth rest member.

15. The aerosol deflecting dental shield and containment device according to claim 13, wherein:
- the deflecting member rotates 180° to 360° on an axis.

16. The aerosol deflecting dental shield and containment device according to claim 13, wherein:
- the upper end of the cylindrical base is operably configured to form a 45° angle with the base sidewall.

17. The aerosol deflecting dental shield and containment device according to claim 13, wherein:
- the deflecting member is operably configured to form a 45° angle with the base sidewall.

18. The aerosol deflecting dental shield and containment device according to claim 13, wherein:
- the base platform is proportionately sized and shaped to receive the upper wall of the deflecting member.

19. The aerosol deflecting dental shield and containment device according to claim 13, wherein the base sidewall further comprises:
- a protuberance disposed on an inner surface of the base sidewall.

20. The aerosol deflecting dental shield and containment device according to claim 13, wherein the deflecting member further comprises:
- a flange directly and rotatably coupled to the base platform, wherein the deflecting member is operably configured to rotate 180° to 360° on an axis relative to the base platform.

* * * * *